United States Patent [19]

Caron

[11] 3,765,004

[45] Oct. 9, 1973

[54] MAGNETIC DOMAIN SERIAL-TO-PARALLEL ARRANGEMENT

[75] Inventor: Lionel Caron, Holmdel, N.J.

[73] Assignee: Bell Telephone Laboratories, Incorporated, Murray Hill, N.J.

[22] Filed: Aug. 2, 1971

[21] Appl. No.: 168,017

[52] U.S. Cl. 340/174 TF, 340/174 SR, 340/174 VB

[51] Int. Cl. ........................ G11c 19/00, G11c 11/14

[58] Field of Search ............................... 340/174 TF

[56] References Cited

UNITED STATES PATENTS 3,678,287 7/1972 Chow ............................ 340/174 TF 3,638,208 1/1972 Chow ............................ 340/174 TF

OTHER PUBLICATIONS

IBM Technical Disclosure Bulletin – Vol. 13 No. 11 Apr. 1971 pg. 3472–3473.

*Primary Examiner*—James W. Moffitt
*Attorney*—W. L. Keefauver

[57] ABSTRACT

A magnetic domain serial-to-parallel converter is realized by a magnetically soft overlay geometry which controls the movement of single wall domains in a slice of magnetic material in response to a reorienting magnetic field. The overlay geometry defines an input channel along which domains are serially propagated. A second channel is arranged parallel to the input channel and is constructed such that a domain propagated therealong will be coincident with consecutive ones of the domains propagated serially along the input channel. At each coincident point the coincident input channel domain is moved to an auxiliary channel for propagation therealong.

14 Claims, 4 Drawing Figures

FIG. 2

| CYCLES AFTER STARTING POINT | FIRST CONTROL DOMAIN | GEN I 1ST BIT | GEN I 2ND BIT | SECOND CONTROL DOMAIN | FIRST DATA BIT | SECOND DATA BIT | THIRD DATA BIT |
|---|---|---|---|---|---|---|---|
| 1 | DELAY 11 | | | P100 | | | |
| 2 | P101 | | | P101 | P100 | | |
| 3 | DELAY 12 | | | DELAY 16 | P101 | P100 | |
| 4 | VP00 | VP00 | | HP00 | HP00 | P101 | P100 |
| 5 | DELAY 13 | f0 | VP00 | DELAY 17 | f0 | HP00 | P101 |
| 6 | VP01 | Df0 | VP01 | HP01 | Df0 | HP01 | HP00 |
| 7 | DELAY 14 | f10 | f1 | DELAY 18 | f1 | f10 | HP01 |
| 8 | VP02 | Df10 | Df1 | HP02 | Df1 | Df10 | HP02 |
| 9 | DELAY 15 | f20 | f11 | DELAY 19 | f2 | f11 | f20 |

Df--: DELAY IN THE FUNCTION CIRCUIT

MAGNETIC DOMAIN SERIAL-TO-PARALLEL ARRANGEMENT

BACKGROUND OF THE INVENTION

This invention relates to arrangements for converting information from a serial format to a parallel format and more particularly to such an arrangement utilizing single wall magnetic domain technology.

The controlled movement of single wall magnetic domains, or bubbles, in a slice of magnetic material in response to a reorienting magnetic field is taught by A. H. Bobeck in U. S. Pat. No. 3,460,116 issued Aug. 5, 1969. Typically, the movement of the domains is controlled by the juxtaposition of a magnetically soft overlay with a surface of the material in which the domains are propagated. The overlay defines magnetic points, certain areas of which become positive or negative in response to a reorienting magnetic field. The overlay elements are constructed in such a manner that different points become magnetically attractive at different magnetic field reorientations thereby defining a path or channel which is followed by a domain. One such overlay, commonly referred to as a T and Bar overlay, is detailed in the above-mentioned Bobeck patent and is arranged to control the movement of magnetic domains in response to a reorienting magnetic field, illustratively having four quadrants, or reorientations, per cycle of rotation.

The usefulness of any such device depends upon the geometry of the respective elements with respect to each other. Thus the elements are advantageously arranged to take advantage of the fact that all domains in a slice of magnetic material under the influence of the same rotating field will propagate through that material in synchronous relationship with each other. Accordingly domains which are propagated along different paths will arrive at certain points of the overlay in a predetermined coordinated relationship. This physical control of magnetic domains in spatial coordination coupled with the interaction forces between domains in close relationship with each other permits consecutive logic operations to be performed between corresponding representations of different sets of information representations solely within magnetic domain technology if the representations are organized in a form to capitalize on those properties. One such organization which supplies signals representative of a change in status of any one of a number of telephone lines is illustrated in copending application Ser. No. 89,631 filed Nov. 16, 1970 of A. J. Perneski and R. M. Smith.

Taking advantage of the fact that the physical location of any magnetic domain in such a device is definable in terms of discrete preset element patterns it is possible to organize the device to attain various logic or system functions. Thus, since domains propagated along a channel can represent data bits and the data bits can be organized into sets to represent word patterns the presence of a magnetic domain in a particular position with a word may be thought of as a logic "1" at that position. In similar manner, the absence of a domain in a position can represent a "0" in that position. Data bits propagated in this manner can be considered as being serially moved along a channel. In certain situations it is desirable to perform logic operations or to otherwise manipulate only certain bits of a set of such bits. Thus, in these situations it is desirable to convert serially propagated information into a form for easy operation on certain bits of the propagated information.

It is an object of my invention to convert information propagated in serial fashion to information propagatable in parallel. More specifically, it is an object of my invention to arrange serially propagated data bits for the performance of logic functions in a parallel manner and the reconvergence of the parallel data along a single channel.

SUMMARY OF THE INVENTION

In one specific embodiment of my invention I arrange domain control elements geometrically to define an input domain propagation channel having a starting position and a plurality of output auxiliary domain propagation channels which have common interaction points or output positions with the input channel. A control channel is constructed such that a control domain circulates therealong in coordinated relationship with consecutive ones of the data bit representations in the input channel. Coordination is such that the control domain is coincident with a first data bit at the interaction point (first output position of the input supply channel) between the input channel and a first one of the auxiliary channels. At each interaction point between subsequent auxiliary channels and the input channel the control domain is coincident with a subsequent one of the input data bits. Accordingly, a first data bit of a first word is propagated along the first auxiliary channel while a second data bit is propagated along the second auxiliary channel. The nth data bit of a set of data bits is then propagated along the nth auxiliary channel.

When the succeeding set of data bits is propagated along the input channel the first bit is propagated along the first auxiliary channel and so on. Thus the first auxiliary channel contains all of the data bits representative of first bits of each word or set of data bits while the nth auxiliary channel contains all of the data bits representative of the nth bits of each set of data bits.

In another specific embodiment of my invention I arrange the output auxiliary channels for intersection with a plurality of output auxiliary channels from a second control channel such that the respective sets of auxiliary channels combine to form a matrix configuration. One of the control channels is associated with the horizontal and the other with the vertical of the matrix configuration. At the respective intersections of the matrix function, circuits are operative to perform logic functions on the data bits propagated thereto. In this specific embodiment domains propagated along the input channel in serial fashion representative of information data bits are preceded by two data control bits. One of the control data bits is utilized to control the horizontal inputs to the functional matrix while the other control data bit is utilized to control the vertical inputs to the matrix. The information data bits are propagated into the matrix by interaction with the control data bits in a selectively controlled manner and are available for parallel functional operation.

In these illustrative embodiments, T and Bar-shaped overlay elements are utilized to define the domain propagation channels and interaction points so that domains are propagated along the channels under control of the geometric structure of the elements and the repulsive forces of coincident domains all in response to a rotating in-plane field.

DESCRIPTION OF THE DRAWING

The operation and utilization of the present invention will be more fully apparent in the following description of the drawing in which:

FIG. 2 is a chart showing certain timing relationships; and

Figure 3:
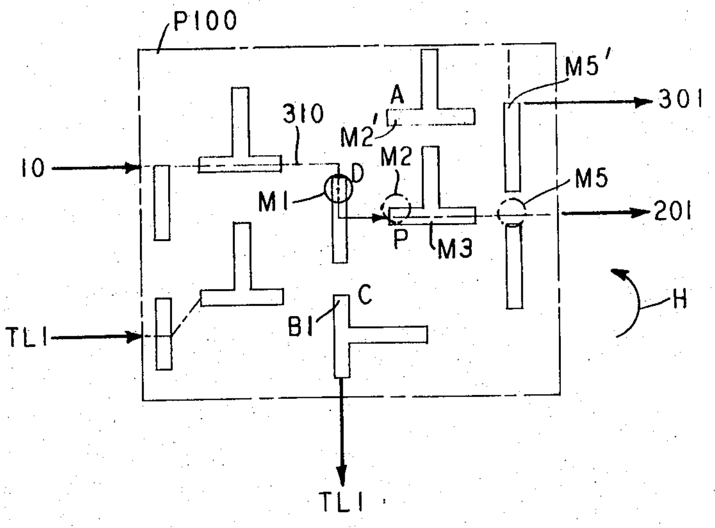
FIG. 3 and 4 are schematic drawings showing in greater detail certain interaction points.

It will be noted that a systematic designation has been employed to illustrate the movement of domains from position to position and to facilitate a more complete understanding of the illustrative embodiment of the invention. Thus, a domain which is in a certain position at an arbitrary starting time as shown as a solid circle. As that domain moves from position to position along a defined channel of elements in response to a continuously changing magnetic field, broken circles are used for illustration. The letter associated with the position such as letter M in FIG. 3 serves to identify the position and to identify any domain thereat. The number associated with each such letter at a specific position represents the number of that position counting from the arbitrary starting position. Thus, corresponding numbers between domains in separate channels having coordinated starting positions indicate synchronously coordinated positions between the channels. The prime sign (′) is used to denote an alternate position for a domain in the associated time slot. Thus, as shown in FIG. 3, M3 is the position in which the M domain will be two positions after a starting position M1 if no force other than the force of the reorienting magnetic field is applied thereto. This path is called the preferred path of the domain and is marked symbolically by the letter P. When a domain encounters some other force, such as the repulsive force of a domain at a control point C (FIG. 3, position B1) instead of moving from the decision point D (FIG. 3, position M1) to the preferred point P (FIG. 3, position M2) the domain moves to the alternate point A (FIG. 3, position M2′). The movement into the prime channel is termed the alternate path of the domain.

Figure 1:
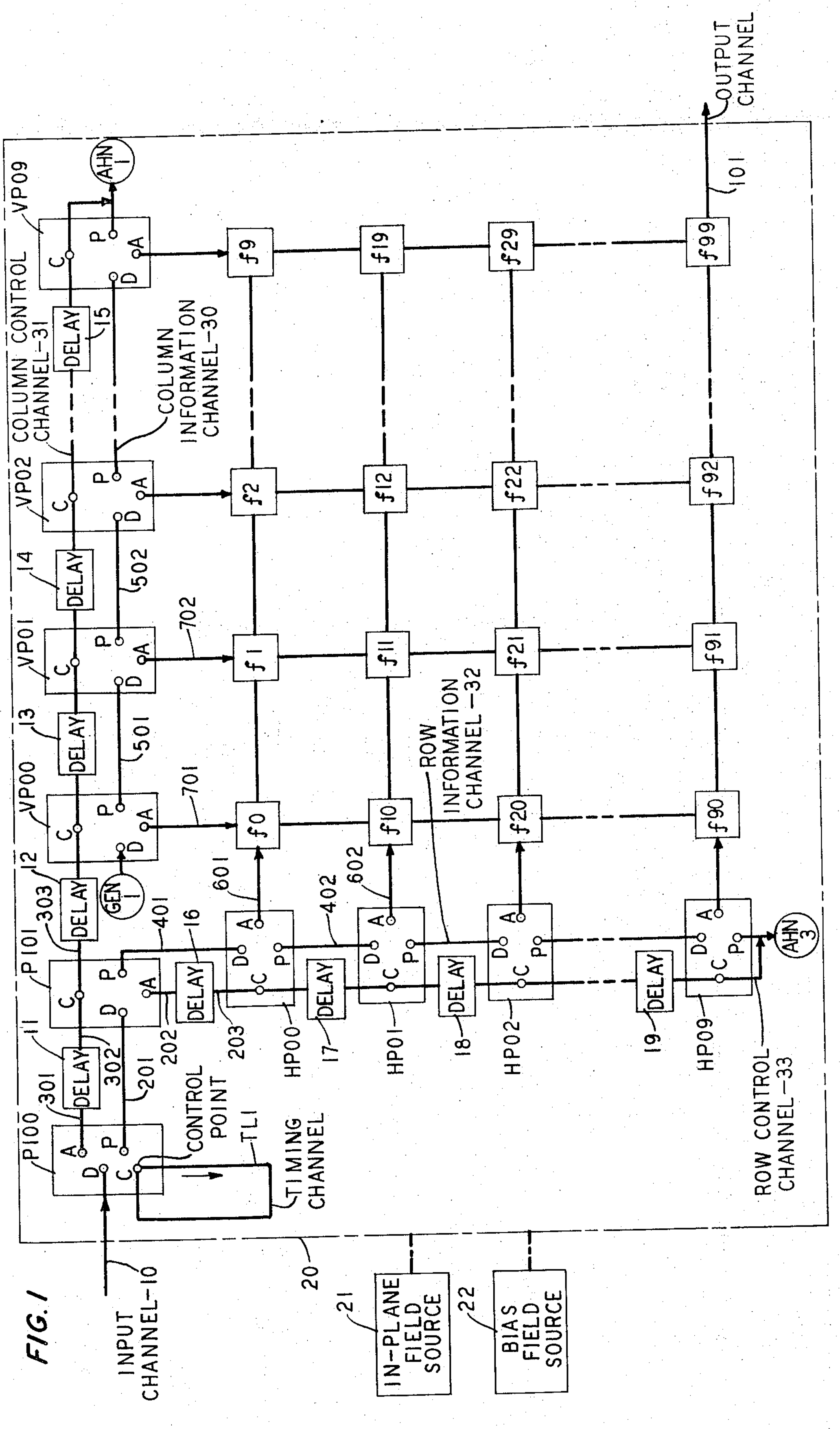
FIG. 1 is a schematic representation showing the interrelationship between interaction points of the exemplary embodiment of the invention.

The A, D, P, and C points of each interaction point are utilized, as shown in FIG. 1, to schematically represent the domain positions which are in coordinated relationship with each other to take advantage of the repulsive forces between domains. Thus, as shown with respect to interaction point P100, a small circle denotes point D which point represents the position of the domain at which a decision is required. Point P denotes the preferred position to which the domain from point D will move if no other force other than the force of a reorienting magnetic field is applied thereto. Point C denotes the position controlling the domain movement from point D such that when domains are concurrently at points C and D the point D domain will move to the alternate position A at the next reorientation of the magnetic field. The precise manner in which the movement of domains at an interaction point, such as at interaction point P100, is controlled, will be discussed in more detail hereinafter.

DETAILED DESCRIPTION

Turning now to FIG. 1, an input domain propagation channel 10 is shown for providing domains in serial fashion to point D of interaction point P100.

Domains may be propagated along input channel 10 from a domain generator, such as the generator described in U. S. Pat. No. 3,555,527 of A. J. Perneski issued Jan 12, 1971, in response to external signals applied to the generator or domains may be propagated along input channel 10 from a preceding functional arrangement of magnetic domains either in the same slice of material 20 or in some other domain propagation device. Domain propagation in domain propagation slice 20 is controlled by in-plane field source 21 in conjunction with bias field source 22 in the manner now well known in the art.

In the illustrative embodiment, preceding each block of data bits propagated along input 10, two magnetic domains are required for control purposes. When the first control domain arrives at point D of interaction point P100, a magnetic domain should be at control point C of interaction point P100 from timing channel TL1. Timing channel TL1 is constructed with as many positional elements as necessary in order to move a single domain around the loop in the direction of the arrow from point C of interaction point P100 and back to point C in a number of cycles of the reorienting magnetic field equal to the length of the data block expected. The domain in timing channel TL1 is coordinated with the first of the two control domains and arrives at point C or interaction point P100 concurrently with the arrival at point D of the first control domain. Thus, since domains are concurrently at point D and point C of interaction point P100, the point D domain takes the alternate path through point A and via channel section 301 to delay 11 which delay circuit is arranged in any one of the now well-known circuit configurations operable to delay domains arriving at the input a certain number of cycles. Delay 11 in the instant embodiment could be any number of cycles of the reorienting magnetic field, but for purposes of discussion herein let us assume that delay 11 is constructed such that two cycles after a domain arrives at point D of interaction point P100 that domain (if that domain follows path 301) arrives at point C of interaction point P101. Thus the domain propagated to the input of delay circuit 11 is subsequently propagated to point C of interaction point P101, over path 302 one cycle later than it would normally be expected to be propagated to that point.

The second control domain arrives at point D of interaction point P100 one cycle after the first control domain arrived thereat. Since the timing channel TL1 domain is no longer present at point C of interaction point P100 the second control domain follows the preferred path 201 to point D of interaction point P101. The length of path 201 is constructed such that one cycle after the domain arrives at point C of interaction point P100 that domain (if that domain follows path 201) arrives at point D of interaction point P101. Since the first control domain is at point C of interaction point P101, two cycles after an arbitrary starting time and since the second control domain lags the first domain by one cycle and requires one more cycle to arrive at point D of interaction point P101, these two domains arrive at that interaction point concurrently. Thus, the domains at points C and D of interaction point P101 exert a mutually repulsive force on each other such that the point D domain takes the alternate path along channel section 202 to delay circuit 16 which delay circuit functions in the exact manner as does delay circuit 11 to provide a one-cycle delay between the domain provided at point A of interaction point P101 and the domain provided to point C of interaction point HP00. Concurrently therewith, the domain at point C of interaction point P101 moves along channel section 303 and through delay circuit 12 to point C of interaction point VP00.

Summarizing briefly at this point, a first domain propagated along input channel 10 interacts with a domain in timing loop TL1 and is thereby diverted into channel section 301 of column control channel 31. That domain is delayed and provided to interaction point P101 two cycles after an arbitrary starting point. A second domain propagated along input channel 10 passes through interaction point P100 without diversion and thereby remains on main channel 201 and is propagated to point D of interaction point P101, also two cycles after the starting point. These two domains interact with each other and the first domain moves into channel section 303 while the second domain moves into channel section 202 for propagating along the respective control channels 31 and 33.

FIG. 2 is a chart showing the various coordinated relationships which exist at various times between the domains. The arrow shown connecting certain of the blocks denotes coincidence of domains at the interaction point shown. Thus, at the second cycle after the arbitrary starting point, as discussed above, the first control domain is coincident with the second control domain at interaction point P101. Also during that cycle the first data bit domain following the two control data bits is at interaction point P100 and, as will be discussed, two cycles therafter (fourth cycle after the arbitary starting cycle) the first data bit of the set of data bits arrives at interaction point HP00, concurrently with the arrival thereat of the second control data bit.

Digressing momentarily, it will be noted from FIG. 1 that in the event that only horizontal inputs to the matrix are desired, only one control domain would proceed the data on input channel 10. That domain would be repelled along channel section 301 delayed by delay 11 and then provided to point C of interaction point HP00 of row control channel 33. Under this condition, column control channel 30 would not be provided and accordingly the second domain (which now would represent data bits) and all subsequent domains propagated along input channel 10 would pass through main channel sections 201 and 401 and along row information channel 32 associated with row control channel 33.

Returning now to the description of FIG. 1, after four complete cycles of the reorienting magnetic field, the first domain is at position C of interaction point VP00 while the second control domain is at position C of interaction point HP00. The third domain (first data bit) to arrive in input channel 10, assuming that domain is one cycle behind the second control domain, arrives at point D of interaction point HP00 in synchronous coordination with the domain at point C thereof. This follows since the length of the path from point P of interaction point P100 through interaction point P101 to point D of interaction point HP00 is constructed such that it is one cycle shorter than the effective length of the path starting from point P through point D of interaction point P101 and along the alternate paths 202 and 203 to point C of interaction point HP00. Thus, upon coincidence, the domain at a point D of interaction point HP00 (the main channel data bit) is moved from point D to point A (first output position of the input supply channel) and along auxiliary channel 601 to functional circuit ***f*0.**

The fourth position domain (second data bit) arriving along input channel 10 propagates along channel sections 201 to interaction point P101 and along channel section 401 to interaction point HP00. Since the control domain previously at point C of interaction point HP00 is now beyond this point, the second data bit follows the preferred path 402 to interaction point HP01. Concurrently with the arrival at point D of the second data bit, the control domain arrives at point C from delay circuit 17. Thus, as shown in FIG. 2, the second control domain is, during the sixth cycle, in coordinated relationship with respect to the second data bit and with respect to interaction point HP01. Since the domains at points C and D of interaction point HP01 are coincident only for the fourth domain to be propagated along input channel 10, only the fourth domain (second data bit) moves from point A of interaction point HP01 (the starting point of channel 602) along auxiliary channel 602 to functional circuit f10.

In similar manner, each succeeding data bit propagated along input channel 10 becomes coordinated sequentially with the control channel data bit at a particular one of the interaction points HP02 to HP09, and thus each data bit moves along a respective one of the auxiliary channels to one of the functional circuits f20 to f90 at each successive cycle of the reorienting magnetic field. When the control channel domain moves through the last interaction point HP09 that domain is propagated to annihilation device AHN3 which annihilation device may be arranged as detailed in U.S. Pat. No. 3,577,131 issued May 4, 1971 to R. H. Morrow and A. J. Perneski which annihilator functions to reduce any domains circulated thereto.

Summarizing briefly at this point, the domains propagated along input channel 10 in serial fashion one cycle apart have been diverted from the main channel into a plurality of auxiliary channels by a domain circulating in a control channel which control channel domain is coincident successively with each of the main channel domains at a particular one of the interaction points associated with each auxiliary channel.

The number of auxiliary channels can be chosen to conform to the maximum number of data bits possible in any data word expected on the input. Of course it will be understood that each data bit of the word need not contain a magnetic domain, and in fact may be vacant. When the vacant data bit arrives at the interaction point corresponding to the position that the data bit represents within the data word the control domain is coincident therewith. Since, under this condition, no interaction will occur the associated auxiliary channel will contain a vacant position also. For example, assume a word size of five bits, and assume a word 10011. Thus the first auxiliary channel will contain a domain, the second and third auxiliary channels will contain vacant positions and the fourth and fifth auxiliary channels will contain domains.

The control channel, as discussed above, is constructed such that the control domain is coincident respectively with each data bit and then the control domain is annihilated. When the next data word is propagated along input 10 the new first two bits (or only the first bit) are diverted into the control channels by the timing channel domain, and the entire operation is repeated. As an alternative the control channel could be constructed for the recirculation of the control domain such that that domain is again coincident with the first data bit and at successive cycles coincident with respective subsequent data bits. Under either arrangement the first data bit of a word would be moved to the first auxiliary channel and each succeeding data bit of each word would be moved to the corresponding auxiliary channel. Thus, assuming the propagation of a first word having bits 10011, and the propagation of a second word having data bits 01010 the first auxiliary channel would have propagated therealong a domain followed some time later by a vacant data bit. The second auxiliary channel would have a vacant position followed by a domain, the third auxiliary channel would have two vacant positions, the fourth auxiliary channel would have two domains propagated therealong, while the fifth auxiliary channel would have a domain followed by a vacant position.

FUNCTIONAL OPERATION ON PARALLEL DATA BITS

In situations where it is desired to perform some functional operation on the respective data bits in a selective manner, provision is made to coordinate functional control domains with each data bit. As shown in FIG. 1, a number of vertical auxiliary channels, such as channels 701 and 702, are utilized to form a matrix with the horizontal auxiliary channels, such as channels 601 and 602. Functional circuits, such as functional circuit f0-f99 are located at the intersections of the matrix. These functional circuits may be advantageously arranged to logically perform, in magnetic domain technology, any of the well-known logic functions, such as AND, OR, XOR or any other desired function.

Control of each function circuit is achieved by propagating thereto a domain on the vertical channel in coordinated relationship to a domain on the horizontal channel. For example, assuming that functional circuit f0 is arranged to provide an output only when both inputs have domains present, then when the first data bit arrives along channel 601 the AND output would be available if a domain would be concurrently propagated along channel 701. The following description will detail the operation of my arrangement to achieve this result.

As discussed previously, and as shown in FIG. 1 and 2, the first control domain arrives at interaction point VP00 at point C thereof during the fourth cycle. GEN1 provides a continuous stream of domains to point D of interaction point VP00 by design. Thus the first control domain repels the point D domain along channel 701, which channel is constructed to be one cycle in length from point A to the input of function circuit *f*0. Thus the function control domain arrives at function circuit *f*0 during the fifth cycle. As discussed above and as shown in FIG. 2 the first data bit also arrives at function circuit *f*0 during the fifth cycle and thus interaction between these domains is possible.

It will be noted that GEN1, although shown as supplying continuous domains, can also be adapted for the selective generation of domains and thus the operation of function circuit *f*0 as well as any other function circuit can be selectively controlled. Utilizing such an approach, assume that it is desired to perform a functional operation only on the second data bit of any word. Accordingly, during the fifth cycle GEN1 provides, under selective control, a domain (second data bit) to point D of interaction point VP00. Since the first control domain is no longer present at point C of that interaction point the point D domain follows the preferred path along channel section 501 to point D of interaction point VP01 arriving thereat during the sixth cycle. As shown in FIG. 2, the first control domain is, during the sixth cycle, at point C ot that interaction point. Thus the GEN1 domain is moved to vertical auxiliary channel 702 for propagation therealong. Each of the functional circuits *f*0-*f*99 is arranged to provide a one-cycle delay on a domain propagating along an associated vertical or horizontal channel. Accordingly three cycles thereafter (ninth cycle) the second GEN1 bit functional control domain arrives at an input to functional circuit *f*11. Concurrently therewith, the second data bit is moved during the sixth cycle from interaction point HP01 along horizontal auxiliary channel 602, delayed one cycle to circuit *f*10, one cycle by circuit *f*10 and one cycle to circuit *f*11 and thus during the ninth cycle is also present on an input to functional circuit *f*11. Thus selective functional operation can occur on the second data bit.

The output from the functional circuits and from each auxiliary channel may be arranged advantageously in numerous configurations to produce certain desired results. For example, as shown in FIG. 1 all of the outputs are combined into a single output channel 101 for propagating the data bits to a next stage of operation. Thus, it would be possible, under one configuration of my invention, to propagate data bits along a single input, each data bit in a specific order and, by arranging the functional circuits as delay circuits and by selectively controlling those circuits as discussed above, the recombined data bit output could contain data bits in a selectively rearranged order from the data bits propagated at the input. Another configuration could allow all first data bits of a certain number of words to be propagated along the output channel followed by all second data bits until all of the data bits have been propagated along the output.

OPERATION OF INTERACTION POINTS

The precise manner in which the interaction points control the flow of domains will now be described with respect to interaction point P100, where a domain arrives at a point D which domain may move normally to the P or preferred position in the absence of any force other than the reorienting magnetic force, represented by arrow H, being applied thereto. Thus, as shown in FIG. 3, a domain arriving along path 10 follows the channel marked as arrow 310 to point M1 correspoinding the point D of interaction point P100. At the next quadrant of the rotating magnetic field the domain from point M1 moves to position M2 corresponding to point P of interaction point P100. Thus, at subsequent quadrants the domain moves out along path 201 which is the preferred path.

Figure 4:
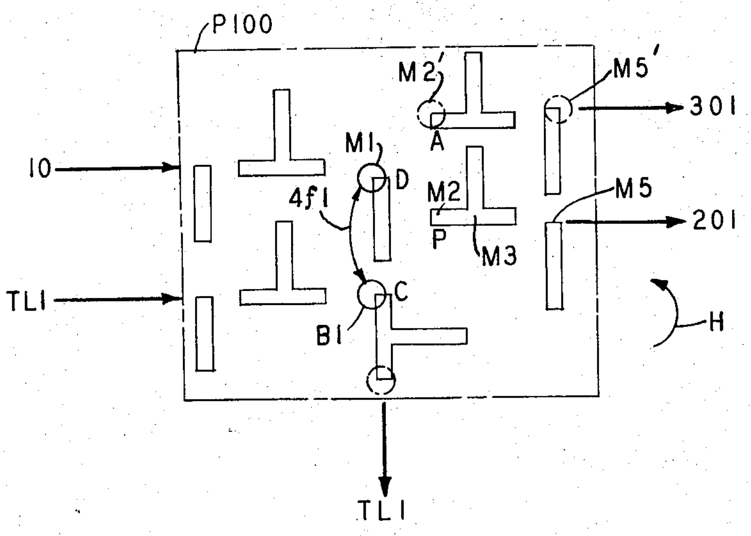

As shown in FIG. 4, when a domain, such as domain M1, is propagated to point D, concurrently with the propagation to point C of a control domain, such as domain B1, the repulsive force 4*f*1 between these domains causes the domain at position D to move to the alternate position A. Thus, a domain arbitrarily at point M1 will move at the next quadrant of the rotating magnetic field to point M2′ under control of repulsive force 4f1 between domains M1 and B1. The domain moved to position M2′ moves along the output path 301 while the domain from position B1 moves during subsequent quadrants of the rotating magnetic field, along timing loop channel TL1.

Conclusion

While the equipment of the invention has been shown in a particular embodiment wherein input data bits have been shown propagated on a single input channel for subsequent diversion to a number of auxiliary channels for functional operation thereon, it is understood that such an embodiment is intended only to be illustrative of the present invention and numerous other arrangements including numerous other path lengths, amounts of delay, and number of propagating cycles may be devised by those skilled in the art without departing from the spirit and scope of the invention.

What is claimed is:

1. An arrangement comprising
- a first propagation channel including an input position and a sequence of output positions,
- means for diverting consecutive ones of data bits introduced at said input position to consecutive ones of said output positions, said diverting means comprising
- a second propagation channel and
- a sequence of interaction positions between said first and second channels at said output positions, said second channel being arranged so that a control bit moving therealong is coincident with consecutive data bits in said first channel at consecutive ones of said output positions.

2. The invention set forth in claim 1 wherein said arrangement is a slice of material in which single wall magnetic domains may be propagated in response to the reorientation of a magnetic field and wherein said data bits are represented by magnetic domains directionally controlled by a pattern of elements distributed on said slice of material.

3. The invention set forth in claim 1 wherein said data bits introduced at said input position represent data words, each word having *n* bits, and wherein
- said control data bit moving in said second channel is coincident with each first data bit of each data word at a first one of said output positions and coincident with each second data bit of each data word at a second one of said output positions and similarly coincident with each successive data bit of each data word at corresponding ones of said output positions such that said control data bit is coincident with each nth data bit of each data word at a nth one of said output positions.

4. The invention set forth in claim 3 further comprising means for diverting each first data bit from said first propagation channel to said second propagation channel for movement therealong.

5. The invention set forth in claim 4 wherein said diverting means includes a timing channel and
- an interaction point between a fixed position of said timing channel and said first propagation channel, said timing channel being arranged to supply a domain to said interaction point in coincidence with each said first data bit to be diverted.

6. The invention set forth in claim 5 wherein said timing channel is a closed loop having an overall recirculation time proportional to the number of bits of each data word.

7. An arrangement for providing data bits to a plurality of output channels, each said output channel having a starting point at a unique position along a data bit supply channel, comprising
- a control channel for moving therealong a data bit in coordinated relationship with one of said supply channel data bits and with one of said output channel starting points,
- means for sequentially changing the main channel data bit and the output channel starting point with which said control channel data bit is in coordinated relationship, and
- means responsive to each said coordinated relationship for controlling domain propagation along said output channel associated with each said coordinated relationship.

8. The invention set forth in claim 7 wherein said output channels comprise an array of n such channels and wherein data bits moving along said supply channel represent sets of data, each set having n data bits, and
- means for establishing a coordinated relationship between said control channel data bit and each first data bit of each set of data bits and the starting point of a first one of said output channels such that each such first data bit moves along said first output channel and each successive data bit of each word moves along a corresponding output channel so that the nth data bit of each said word moves along said nth output channel.

9. The invention set forth in claim 7 wherein said controlling means includes
- a plurality of interaction points between said control channel, said supply channel and said output channels, each said interaction point arranged to divert data bits moving along said supply channel into a unique one of said output channels upon coincidence of a data bit moving along said control channel and a data bit moving along said supply channel at said interaction point.

10. The invention set forth in claim 9 wherein said data bit coordination is controlled by the respective channel lengths along which each said data bit moves.

11. The invention set forth in claim 7 wherein said output channels comprise an array of *n* such channels and wherein data bits moving along said supply channel represent sets of data, each set having $n+1$ data bits,
- means for diverting a first data bit of each set of said supply channel data bits into said control channel for movement therealong, and
- means for establishing a coordinated relationship between said control channel data bit and each second data bit of each set of data bits and the starting point of a first one of said output channels such that each said second data bit moves along said first output channel and each successive data bit of each word moves along a corresponding output channel so that the nth data bit of each word moves along said nth output channel.

12. The invention set forth in claim 11 wherein said diverting means includes
- a closed loop timing channel through which a timing data bit can be moved for periodic interaction with said supply channel data bits, thereby providing periodic control channel data bits for movement along said control channel.

13. The invention set forth in claim 7 further comprising a second control channel for moving therealong a data bit in coordinated relationship with a particular one of said supply channel data bits, means for sequentially changing the particular supply channel data bit with which said second control channel data bit is in said coordinated relationship, and selectively controllable means operable in conjunction with said second control channel sequentially changing means for moving a data bit to any said output channel in coordinated relationship with each successively coordinated supply channel data bit.

14. The invention set forth in claim 13 wherein said second control channel propagation means includes means for diverting a first one of said supply channel data bits into said second control channel for movement therealong and means for diverting a second one of said supply channel data bits into said control channel for movement therealong.

* * * * *